J. L. OSGOOD.
METHOD OF MAKING OIL CAPS.
APPLICATION FILED AUG. 7, 1913.

1,120,525.

Patented Dec. 8, 1914.

Witnesses.

Inventor.
John L. Osgood.
by Wilhelm Parker & Hard
Attorneys.

UNITED STATES PATENT OFFICE.

JOHN L. OSGOOD, OF BUFFALO, NEW YORK.

METHOD OF MAKING OIL-CAPS.

1,120,525.  Specification of Letters Patent.  Patented Dec. 8, 1914.

Application filed August 7, 1913. Serial No. 783,544.

*To all whom it may concern:*

Be it known that I, JOHN L. OSGOOD, a citizen of the United States, residing at Buffalo, in the county of Erie and State of New York, have invented a new and useful Improvement in Methods of Making Oil-Caps, of which the following is a specification.

This invention relates to the manufacture of oil caps, or valved closures for oiling ducts, of that type which have an oil entrance orifice normally closed by a spring seated ball or valve that is adapted to be pushed inwardly by the spout of the oil can to open the orifice when introducing the oil.

The objects of the invention are to produce, by a simple, expeditious and inexpensive method, a practical and desirable oil cap of this kind which is of exceedingly simple construction.

Figure 1:
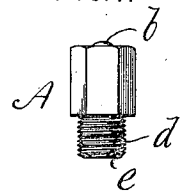
Figure 2:

In the accompanying drawings: Figure 1 is an elevation of an oil cap made in accordance with the invention. Fig. 2 is a cross section thereof. Figs. 3, 4, 5 and 6 are enlarged sectional elevations illustrating successive steps in the method of manufacturing the caps.

Figure 6:
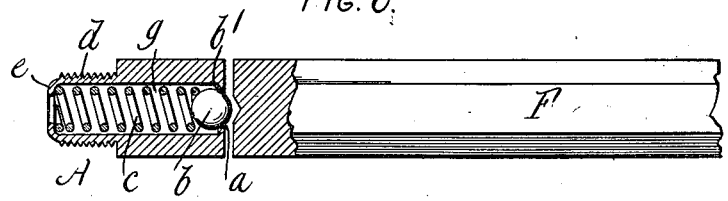

A, Figs. 1, 2 and 6 represents the oil cap, which, as usual, comprises a hollow or tubular body provided at one end with an oil inlet orifice $a$ which is normally closed by a ball or valve $b$ that is located in the cap and is yieldingly held to its seat $b'$ by a spring $c$, also located in the cap body. The cap has the usual screwthreaded shank $d$ for securing it in place in communication with the oil duct leading to the part to be lubricated. The body of the cap with the exception of the threaded shank is preferably of polygonal cross-sectional shape externally, thus adapting it to be turned with a wrench for securing it in place and detaching it. This shape, furthermore, enables the cap to be readily made from polygonal stock as hereinafter explained.

$e$ represents an inwardly projecting spring seat at the shank end of the cap, which retains the valve spring in place and affords a bearing for the adjacent end thereof. This seat is formed by an integral end lip or flange of the body which is spun or turned inwardly after the ball valve and spring have been placed in the cap.

Figure 3:
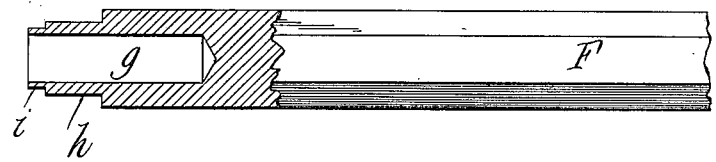
Figure 4:
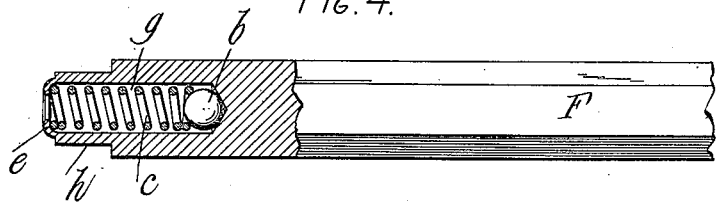
Figure 5:

The body of the cap including the spring seat $e$ and the seat $b'$ around the oil orifice for the ball valve consists of a single integral piece, thus making an exceedingly simple cap and enabling the same to be manufactured at a very small expense, as will appear from the following description: The cap bodies are produced in a turning lathe from long polygonal stock or bars F, Figs. 3–6, which correspond in cross-sectional shape and dimensions with the polygonal portion of the cap body. The stock F is fed endwise through the lathe chuck and is operated upon by suitable tools presented in succession to the work, as is done in turning articles from continuous stock in a lathe. In the first operation a suitable compound tool drills a spring chamber $g$ with a conical inner end and reduces the end portion of the stock forming a cylindrical part $h$ for the threaded shank and an end flange $i$, leaving the stock as shown in Fig. 3. The second operation consists in placing the ball or valve $b$ and the spring $c$ in the spring chamber or cavity $g$ and turning inwardly the flange $i$ by a spinning tool to form the spring seat $e$ as indicated in Fig. 4. In the third operation a threading tool cuts the screwthread on the shank $d$, leaving the stock as shown in Fig. 5. A cutting-off tool is then used to sever the cap from the stock by a transverse cut intersecting the conical inner end of the spring cavity, as indicated in Fig. 6, thus forming the oil inlet opening $a$ and completing the cap. Since the cap is cut off in a plane between the extremities of the conical inner end of the spring chamber, a flange is left that forms the seat $b'$ for the ball or valve. In cutting off the cap the ball $b$ is forced back in the spring chamber by the cutting-off tool and does not interfere with the cutting action of the tool. The cap can thus be completely finished in four simple operations without removing the stock from the lathe. It will be understood that the tools for the successive operations can be mounted on a turret and suitable gages employed to enable the operations to be performed in quick succession with the minimum amount of labor. The thread could, of course, be cut on the shank before spinning in the spring seat $e$, but the seat is preferably spun before cutting the thread so as to avoid possible mutilation of the thread. It may also be possible to form the threaded shank and the integral inturned spring seat $e$ and insert the spring and ball in a different order and by different tools in a greater or less number of operations, but these operations are all performed in whichever way may be adopted before the cap is severed from the stock, as thereby the handling of the cap and the operation upon the same by different machines or tools after it is cut from the stock is avoided and the manufacture of the cap is greatly simplified.

I claim as my invention:

1. The herein described method of making oil caps having a valve-closed oil inlet orifice at one end, consisting in forming a chamber with a reduced inner end in the end of a bar, inserting the valve in said chamber, turning inwardly the extremity of the bar to form a retaining part, and severing the chambered portion of the bar from the bar in a plane intersecting said reduced inner end of the chamber, thereby forming the oil inlet opening, substantially as set forth.

2. The herein described method of making oil caps having a valve-closed oil inlet orifice at one end, consisting in drilling a chamber with a conical inner end in the end of a bar, inserting the valve and a seating spring therefor in said chamber, forming an inwardly extending seat for the spring by an integral end portion of the bar, and severing the chambered portion of the bar from the bar in a plane intersecting said conical inner end of said chamber, thereby forming the oil inlet opening, substantially as set forth.

3. The herein described method of making oil caps having a valve-closed oil inlet orifice at one end, consisting in drilling a chamber with a conical inner end in the end of a bar, inserting the valve and a seating spring therefor in said chamber, spinning inwardly the extremity of the bar to form a seat for the spring, and severing the chambered portion of the bar from the bar in a plane intersecting said conical inner end of said chamber, thereby forming the oil inlet opening, substantially as set forth.

4. The herein described method of making oil caps having a valve-closed oil inlet orifice at one end, consisting in drilling a chamber with a conical inner end in the end of a bar of polygonal cross section, inserting the valve and a seating spring therefor in said chamber, forming a screwthreaded shank and an inturned integral seat for the spring at the end of the bar, and severing the chambered portion of the bar from the bar in a plane intersecting said conical inner end of said chamber, thereby forming the oil inlet opening, substantially as set forth.

5. The herein described method of making oil caps having a valve-closed oil inlet orifice at one end, consisting in first drilling a chamber with a conical inner end in the end of the bar of polygonal cross-section and reducing the end portion of the bar to cylindrical form with an end flange, then inserting the valve and a seating spring therefor in said chamber, then spinning said end flange inwardly to form a seat for the spring, then screwthreading the cylindrical portion of the bar, and then severing the chambered portion of the bar from the bar in a plane intersecting said conical inner end of said chamber, thereby forming the oil inlet opening, substantially as set forth.

Witness my hand this 4 day of August, 1913.

JOHN L. OSGOOD.

Witnesses:
JOHN DEMPSEY,
ARTHUR MUELLER.